(12) United States Patent
Yoshikawa et al.

(10) Patent No.: US 8,159,097 B2
(45) Date of Patent: Apr. 17, 2012

(54) MOTOR AND ELECTRONIC APPARATUS USING THE SAME

(75) Inventors: Yuichi Yoshikawa, Osaka (JP); Hiroaki Kawasaki, Osaka (JP); Kenji Sugiura, Osaka (JP); Hiroshi Ueda, Kyoto (JP); Hiroki Asai, Hyogo (JP)

(73) Assignee: Panasonic Corporation, Osaka (JP)

(*) Notice: Subject to any disclaimer, the term of this patent is extended or adjusted under 35 U.S.C. 154(b) by 98 days.

(21) Appl. No.: 12/813,258

(22) Filed: Jun. 10, 2010

(65) Prior Publication Data

US 2010/0327692 A1    Dec. 30, 2010

(30) Foreign Application Priority Data

Jun. 25, 2009   (JP) ................................ 2009-151270

(51) Int. Cl.
*H02K 7/00* (2006.01)
(52) U.S. Cl. ............ 310/68 B; 310/216.111; 310/156.05
(58) Field of Classification Search ................ 310/68 B, 310/156.01, 156.05, 156.06, 216.111, 216.097, 310/216.091, 216.064, 216.074
See application file for complete search history.

(56) References Cited

U.S. PATENT DOCUMENTS

| | | | | |
|---|---|---|---|---|
| 4,755,701 A * | 7/1988 | Shikama | ................ | 310/156.05 |
| 5,245,234 A * | 9/1993 | Okada et al. | .................... | 310/51 |
| 5,408,153 A * | 4/1995 | Imai et al. | ................... | 310/68 B |
| 5,410,201 A * | 4/1995 | Tanaka et al. | ............... | 310/68 B |
| 5,604,389 A * | 2/1997 | Nitta et al. | .................. | 310/67 R |
| 5,798,583 A * | 8/1998 | Morita | .................... | 310/216.111 |
| 6,759,784 B1 * | 7/2004 | Gustafson et al. | ......... | 310/254.1 |
| 6,979,931 B1 * | 12/2005 | Gustafson et al. | ......... | 310/254.1 |
| 7,242,121 B2 * | 7/2007 | Kadowaki | ................ | 318/400.04 |
| 8,067,870 B2 * | 11/2011 | Kobayashi et al. | ...... | 310/156.05 |
| 2002/0195888 A1 * | 12/2002 | Utsumi | ....................... | 310/67 R |
| 2006/0006747 A1 | 1/2006 | Kadowaki | | |
| 2006/0197402 A1 | 9/2006 | Gomyo et al. | | |
| 2010/0237752 A1 * | 9/2010 | Yoshikawa et al. | ......... | 310/68 B |
| 2010/0314965 A1 | 12/2010 | Yoshikawa et al. | | |
| 2010/0327691 A1 | 12/2010 | Yoshikawa et al. | | |

FOREIGN PATENT DOCUMENTS

| | | |
|---|---|---|
| JP | 9-285044 | 10/1997 |
| JP | 200625537 | 1/2006 |
| JP | 2007244004 | 9/2007 |

* cited by examiner

*Primary Examiner* — Dang Le
(74) *Attorney, Agent, or Firm* — Hamre, Schumann, Mueller & Larson, P.C.

(57) ABSTRACT

A rotor 14 is rotatably disposed around a stator 13 that is provided with a plurality of magnetic poles 13a. The inner circumferential face of the rotor is provided with a magnet 15 on whose face opposing the stator main magnetization is performed, and on whose face opposing the substrate FG magnetization is performed. The outer circumferential ends of the magnetic poles of the stator are provided with extended portions 13b and 13c that vertically extend from the magnetic pole base 13d. A face of the substrate opposing the rotor is provided with a FG pattern 19 opposing the magnet 15. The FG pattern is disposed on an outer side in a radial direction of the outer circumferential face of the stator. When an angle formed by a straight line connecting a central position in the radial direction of the magnet and a central position in the radial direction of the FG pattern with respect to a central axis of a driving shaft is taken as θ, and an angle formed by a direction of the FG magnetization with respect to the central axis of the driving shaft is taken as A, 0 degree<A≦θ is satisfied. Accordingly, it is possible to improve the precision in detecting the rotational speed by reducing noise superimposed on the FG signal, while securing a high driving efficiency.

3 Claims, 7 Drawing Sheets

MOTOR AND ELECTRONIC APPARATUS USING THE SAME

BACKGROUND OF THE INVENTION

1. Field of the Invention

The present invention relates to a motor and an electronic apparatus using the same.

2. Description of the Related Art

In electronic apparatuses such as laser printers, a paper feed roller (driven member) provided in a main body case is coupled via a deceleration mechanism to a driving shaft of a motor. When this motor is driven, the paper feed roller rotates and feeds paper to a predetermined portion.

As this motor, a brushless DC motor that ordinarily is used includes: a stator on whose outer circumference a plurality of magnetic poles are arranged at a first predetermined interval; and a rotor that is rotatably disposed around the stator; wherein an inner circumferential face of the rotor is provided with a magnet magnetized to have opposite polarities at a second predetermined interval (main magnetization).

In this sort of motor, ordinarily in order to arrange the magnet of the rotor as close as possible to a magnetism-detecting element that magnetically detects rotation of the rotor, the size of the magnet in a direction parallel to a motor-driving shaft is set larger than the size of a magnetic pole base of the stator in the same direction. In this case, an extended portion, called an "end plate", that extends in a direction substantially parallel to the magnet often is formed on both sides of a magnetic pole base, at outer circumferential ends of the magnetic poles of the stator (see JP H9-285044A and JP 2007-244004A, for example). Accordingly, the area in which the magnet of the rotor and the magnetic poles of the stator oppose each other increases, and, thus, the driving force and the driving efficiency of the motor can be increased.

Furthermore, for example, in the case where a paper feed roller of a laser printer is driven via a deceleration mechanism, the rotation of a brushless DC motor has to be controlled precisely. Accordingly the rotational speed of the brushless DC motor has to be detected at a certain level of resolution.

As a speed-detecting method appropriate for this sort of purpose, a FG method (described later) ordinarily is used. That is to say, the magnet of the rotor is magnetized to generate a torque (main magnetization), and, moreover, multi-pole magnetization (FG magnetization) in a direction opposing the substrate is performed on a face of the magnet opposing a substrate. Furthermore, the substrate is provided with a FG pattern in the circumferential direction, in which linear elements in the same number as that of magnetized poles of the FG magnetization are connected in series. When the rotor rotates, an induced voltage is generated at the linear elements due to magnetic fluxes obtained by the FG magnetization, and a speed detection signal (FG signal) at a frequency proportional to the rotations of the motor can be obtained through this FG pattern.

In this sort of FG method, in order to reduce the influence of magnetic fluxes obtained by the main magnetization, there is a known method for canceling the influence of magnetic fluxes obtained by the main magnetization, by configuring the FG pattern from a main pattern and a cancellation pattern and connecting the main pattern and the cancellation pattern in series (see JP 2006-25537A, for example).

However, in the case where an extended portion that extends in a direction substantially parallel to the magnet is provided at outer circumferential ends of the magnetic poles of the stator, it may be difficult to cancel the influence of magnetic fluxes obtained by the main magnetization in the above-described FG method. The reason is as follows.

The extended portion provided at the outer circumferential ends of the magnetic poles has a magnetism collecting effect, and, thus, most of magnetic fluxes obtained by the main magnetization are drawn into the extended portion. However, part of the magnetic fluxes flowing into the extended portion leaks out of the extended portion due to magnetic saturation of the extended portion, and forms leakage magnetic fluxes. These leakage magnetic fluxes significantly affect a portion of the FG pattern close to the stator (i.e., a portion on the inner circumferential side of the FG pattern in the radial direction). Accordingly, the influence of the leakage magnetic fluxes obtained by the main magnetization differs between a portion of the FG pattern close to the stator and a portion away from the stator in the radial direction, and the influence of the leakage magnetic fluxes obtained by the main magnetization cannot be canceled sufficiently. As a result, noise is superimposed on the FG signal, and the precision in detecting the rotational speed is lowered.

SUMMARY OF THE INVENTION

It is an object of the present invention to solve the above-described conventional problem, by improving the precision in detecting the rotational speed by reducing noise superimposed on the FG signal, while securing a high driving efficiency, in a motor in which extended portions are provided at outer circumferential ends of magnetic poles of a stator.

The present invention is directed to a motor, including: a stator that is mounted on a substrate and on whose outer circumference a plurality of magnetic poles are arranged at a first predetermined interval; and a rotor that is rotatably disposed around the stator. The inner circumferential face of the rotor is provided with a magnet, main magnetization is performed on a face of the magnet opposing the stator to have opposite polarities at a second predetermined interval in a direction opposing the stator, and FG magnetization is performed on a face of the magnet opposing the substrate to have opposite polarities at a third predetermined interval. Each of the outer circumferential ends of the plurality of magnetic poles of the stator is provided with a first extended portion that extends from a magnetic pole base to the substrate side, and a second extended portion that extends from the magnetic pole base to a side opposite the substrate side. A face of the substrate opposing the rotor is provided with a FG pattern including a main pattern and a cancellation pattern such that the FG pattern opposes the magnet. The FG pattern is disposed on an outer side in a radial direction of the outer circumferential face of the stator. In a cross-section along a plane including a central axis of a driving shaft coupled to the rotor, when an angle formed by a straight line connecting a central position in the radial direction of the magnet and a central position in the radial direction of the FG pattern with respect to the central axis of the driving shaft is taken as θ (θ<90 degrees), and an angle formed by a direction of the FG magnetization with respect to the central axis of the driving shaft is taken as A (A<90 degrees), 0 degree<A≦θ is satisfied.

The present invention is directed to an electronic apparatus, including: a main body case; a driven member that is provided in the main body case; and a motor that is coupled to the driven member; wherein the motor is the motor according to the present invention.

DESCRIPTION OF THE PREFERRED EMBODIMENTS

In the motor of the present invention, outer circumferential ends of the magnetic poles of the stator have the first and the second extended portions, and, thus, a magnetism collecting effect can be improved, and a high driving efficiency can be realized.

Furthermore, the FG pattern is disposed on an outer side in a radial direction of the outer circumferential face of the stator, and, thus, leakage magnetic fluxes formed by magnetic fluxes obtained by the main magnetization leaking out of the first extended portion hardly are linked to the FG pattern. Meanwhile, the FG pattern is disposed on a face of the substrate opposing the rotor so as to oppose the magnet, and a direction of the FG magnetization is oblique such that 0 degree<A≦θ is satisfied. Thus, the amount of magnetic fluxes obtained by the FG magnetization linked to the FG pattern can be increased. Accordingly, noise superimposed on the FG signal is reduced, and the precision in detecting the rotational speed using the FG pattern can be improved.

The electronic apparatus of the present invention drives a driven member using the above-described motor of the present invention and thus can drive the driven member efficiently and precisely.

Hereinafter, the present invention will be described using preferred embodiments. Here, it will be appreciated that the present invention is not limited to the following embodiments.

Figure 1:
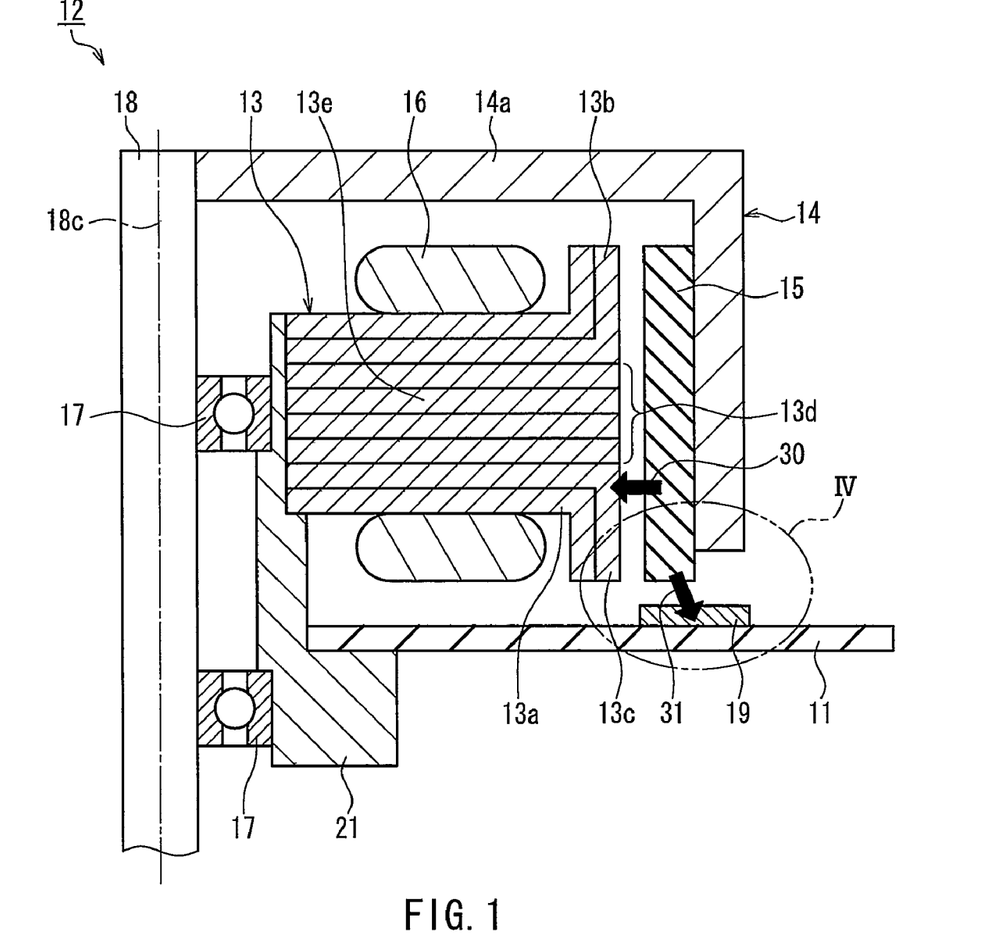
FIG. 1 is a cross-sectional view showing the schematic configuration of a motor according to an embodiment of the present invention.
Figure 2:
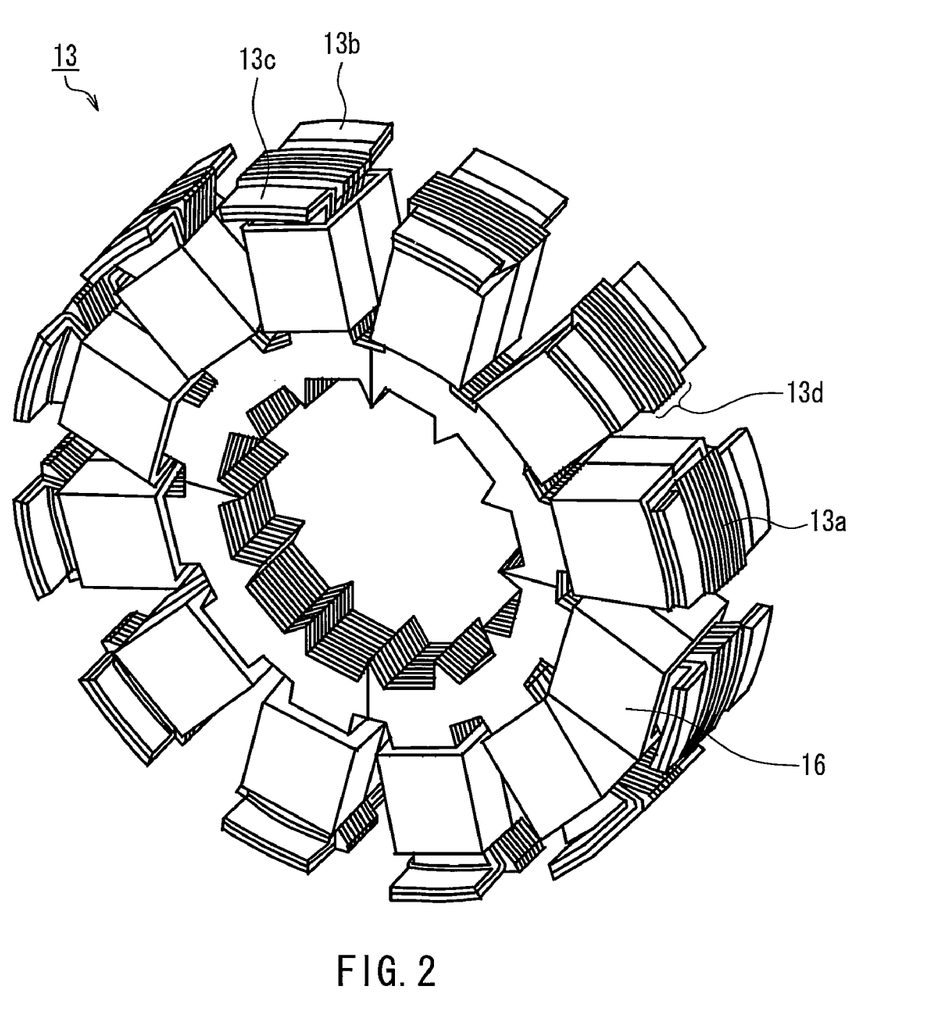
FIG. 2 is a perspective view of a stator constituting the motor according to the embodiment of the present invention.
Figure 3:
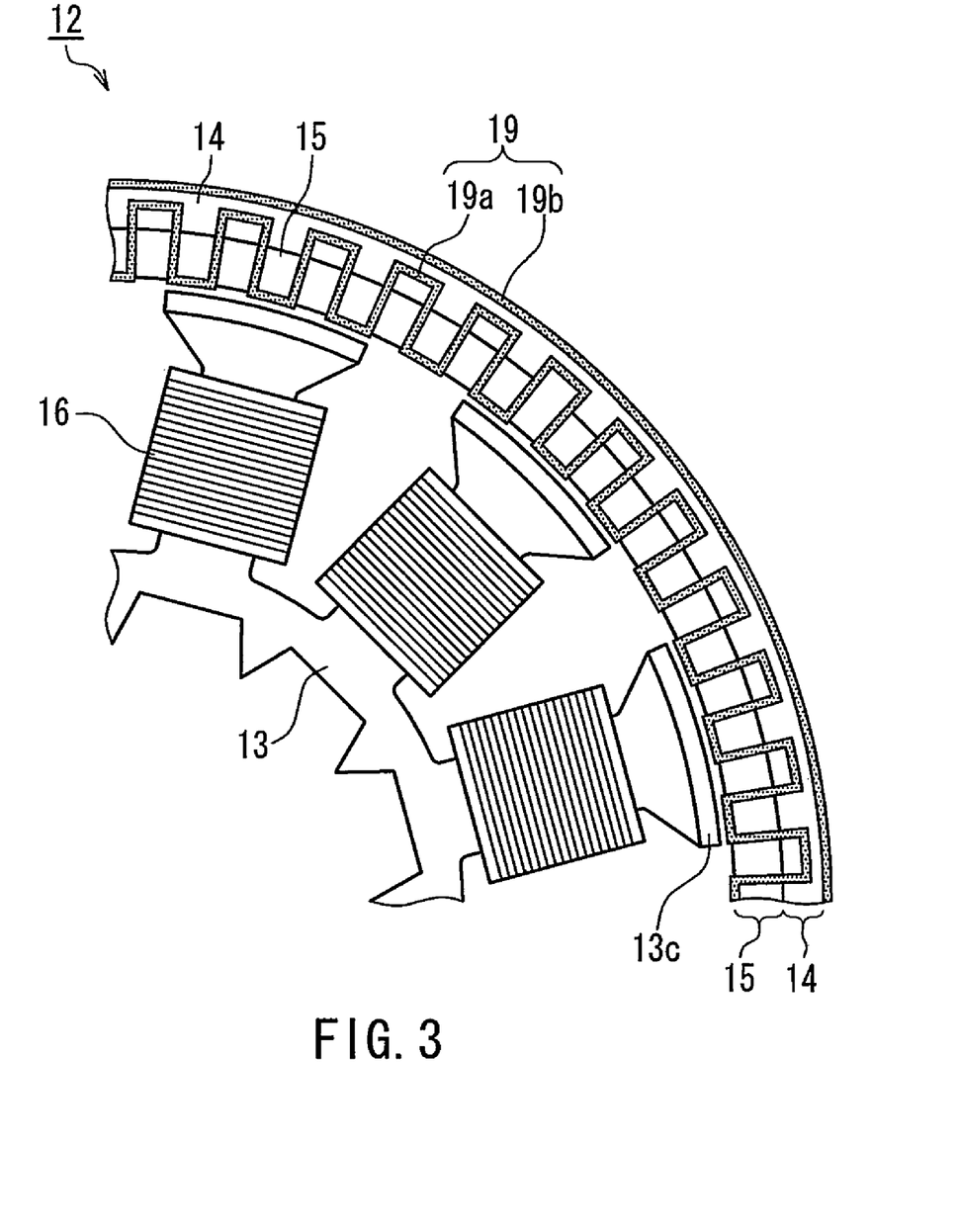
FIG. 3 is a plan view of a FG pattern provided in the motor according to the embodiment of the present invention.

FIG. 1 is a cross-sectional view along a plane including a central axis 18c of a driving shaft 18, showing the schematic configuration of a motor 12 according to an embodiment of the present invention. The cross-sectional view of the motor is substantially symmetrical with respect to the central axis 18c of the driving shaft 18, and, thus, FIG. 1 shows only a half portion with respect to the driving shaft 18. FIG. 2 is a perspective view of a stator 13 constituting the motor 12 according to this embodiment. FIG. 3 is a plan view of a FG pattern 19 provided in the motor 12 according to this embodiment. FIG. 3 shows only a first quadrant of the FG pattern 19.

In the description below, the direction of the driving shaft 18 of the motor 12 is taken as a vertical direction, and the upper side and the lower side in the section of the diagram of FIG. 1 are referred to respectively as an "upper side" and a "lower side" of the motor 12. Furthermore, a direction perpendicular to the central axis 18c of the driving shaft 18 is referred to as a "radial direction".

As shown in FIG. 1, the motor 12 of Embodiment 1 includes the stator 13 that is mounted on a wiring board (substrate) 11 via an attachment portion 21, and a rotor 14 that is disposed around the stator 13. The rotor 14 is in the shape of a cylinder. The upper end thereof has a top plate 14a fixed thereto, and the lower end thereof is open. The inner circumferential face of the attachment portion 21 is provided with bearings 17. The driving shaft 18 of the motor 12 passes through the bearings 17, and the upper end of the driving shaft 18 is fixed to the top plate 14a of the rotor 14. As a result, the rotor 14 and the driving shaft 18 are freely rotatable about the central axis 18c of the driving shaft 18 with respect to the stator 13 via the bearings 17.

A magnet 15 in the shape of a ring is fixed to the inner circumferential face of the rotor 14. Magnetization is performed on a face of the magnet 15 opposing the stator 13 such that an N-pole and an S-pole are formed alternately (such that adjacent poles have opposite polarities) at a predetermined interval (main magnetization 30). The direction of the main magnetization 30 is substantially parallel to the radial direction. Furthermore, in addition to the main magnetization, multi-pole magnetization is performed on a face (lower face) of the magnet 15 opposing the wiring board 11 such that an N-pole and an S-pole are alternately formed at a predetermined interval (FG magnetization 31).

The stator 13 may be a layered member in which a plurality of plate-shaped members having the same thickness (e.g., thin steel plates having a high magnetic permeability) are layered. As shown in FIG. 2, a plurality of magnetic poles 13a are arranged at a predetermined interval in the circumferential direction on the outer circumference of the stator 13. A coil 16 for an electromagnet is wound about a portion where a magnetic circuit is formed (a magnetic path 13e, see FIG. 1) on the inner side of each magnetic pole 13a. When an AC power is applied to the coil 16, each magnetic pole 13a is magnetized to have an N-polarity and an S-polarity alternately. Accordingly, attraction or repulsion is generated between the magnetic pole 13a and the magnet 15 opposing each other, the rotor 14 rotates about the driving shaft 18, and a rotational driving force is output via the driving shaft 18.

The wiring board 11 is provided with the FG pattern 19. As shown in FIG. 3, in order to reduce the influence of the main magnetization, the FG pattern 19 is configured from a zigzag main pattern 19a and a circular cancellation pattern 19b, and the main pattern 19a and the cancellation pattern 19b are connected in series. Here, the configuration of the main pattern 19a and the cancellation pattern 19b is not limited to that in FIG. 3, and configurations other than the above can be applied. Furthermore, the cancellation pattern 19b may be provided inside the main pattern 19a (on the driving shaft 18 side).

As the amount of magnetic fluxes obtained by the FG magnetization 31 of the magnet 15 linked to the FG pattern 19 increases, FG components in a FG signal output from the FG pattern 19 increases, and the S/N ratio is improved. Accordingly, in this embodiment, the FG pattern 19 is provided on the upper face (face opposing the rotor 14) of the wiring board 11 as shown in FIG. 1. Furthermore, the FG pattern 19 opposes a face (lower face) of the magnet 15 opposing the wiring board 11. Here, a state in which the FG pattern 19 and the lower face of the magnet 15 oppose each other refers to a state in which, as shown in FIG. 3, at least part of the FG pattern 19 and at least part of the lower face of the magnet 15 overlap each other when viewed in a direction parallel to the central axis 18c of the driving shaft 18.

Furthermore, in order to increase the amount of magnetic fluxes obtained by the FG magnetization 31 of the magnet 15 linked to the FG pattern 19, it is advantageous that the magnet 15 and the FG pattern 19 are arranged as close to each other as possible. Thus, as shown in FIG. 1, an end portion of the magnet 15 on the wiring board 11 side (i.e., the lower end of the magnet 15) is extended to be near the wiring board 11.

As a result, the vertical size of the magnet 15 increases. In accordance with this increase, the outer circumferential end of each magnetic pole 13a of the stator 13 has a first extended portion 13c that extends from a central magnetic pole base 13d to the wiring board 11 side (lower side), and a second extended portion 13b that extends from the magnetic pole base 13d to the side opposite the wiring board 11 side (upper side, that is, on the top plate 14a side). The first extended portion 13c and the second extended portion 13b are substantially parallel to the magnet 15, that is, substantially parallel to the central axis 18c of the driving shaft 18. More specifically, the first extended portion 13c is formed by bending outer circumferential portions of two lower layers, including the lowermost layer, of a plurality of layers of plate-shaped members constituting the stator 13 downward at a substantially right angle, and the second extended portion 13b is formed by bending outer circumferential portions of two upper layers, including the uppermost layer, of the plurality of layers of plate-shaped members constituting the stator 13 upward at a substantially right angle. Here, the number of layers of plate-shaped members constituting the first and the second extended portions 13c and 13b is not limited to two, and may be one, or three or more.

In the case where the first extended portion 13c and the second extended portion 13b are arranged vertically on the magnetic pole base 13d from the outer circumferential end of the magnetic pole 13a in this manner, the area in which the magnetic pole 13a and the vertically extended magnet 15 oppose each other increases as shown in FIG. 1. The first extended portion 13c and the second extended portion 13b have a magnetism collecting effect, and, thus, magnetic fluxes obtained by the main magnetization drawn into the stator 13 increase, and the driving force and the driving efficiency of the motor 12 are improved. The first extended portion 13c and the second extended portion 13b ordinarily are referred to as end plates.

Figure 4:
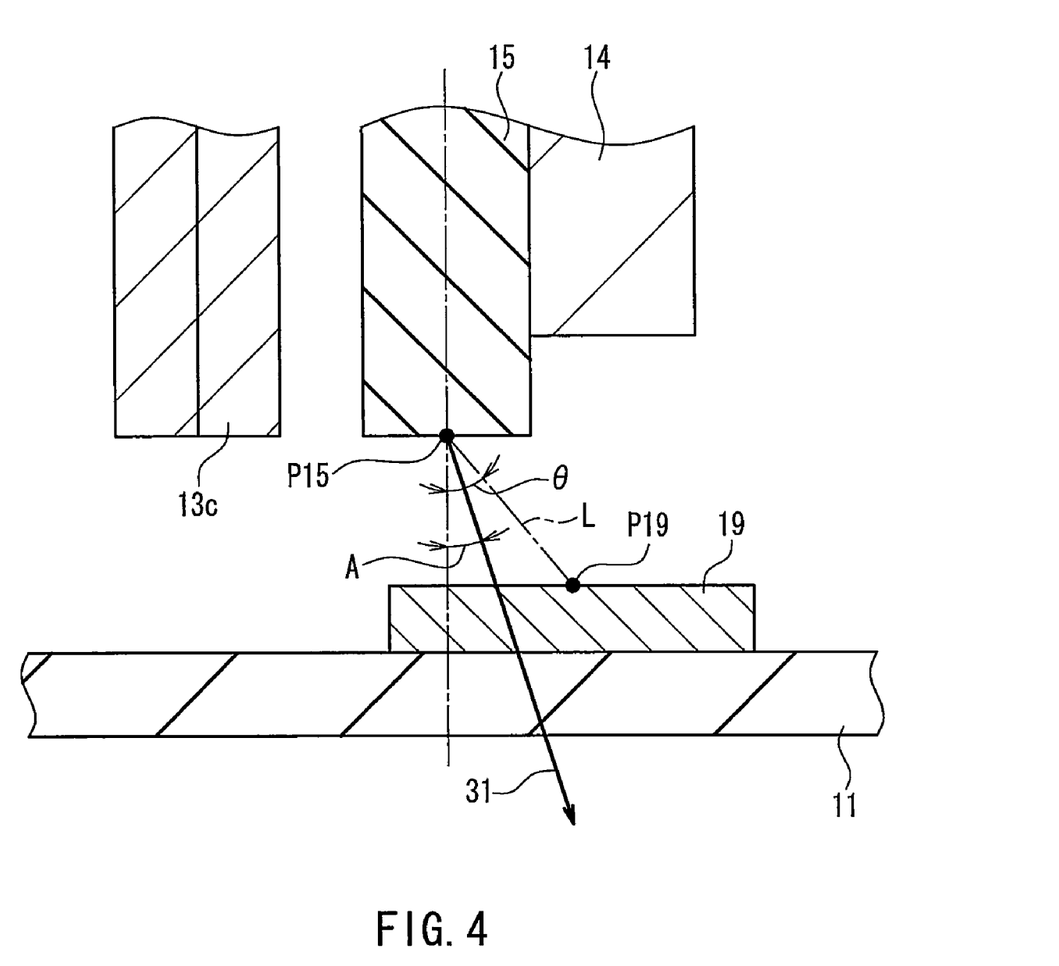
FIG. 4 is an enlarged cross-sectional view of a portion IV of FIG. 1.

FIG. 4 is an enlarged cross-sectional view of a portion IV of FIG. 1. In this embodiment, as shown in FIGS. 1 and 4, the FG pattern 19 is disposed on an outer side in the radial direction (on a side opposite the driving shaft 18 side) of the outer circumferential face of the stator 13. Furthermore, in a cross-section along a plane including the central axis 18c of the driving shaft 18, when an angle formed by the direction of the FG magnetization 31 with respect to the central axis 18c of the driving shaft 18 (see FIG. 1) is taken as A (A<90 degrees), and an angle formed by a straight line L connecting a central position P15 in the radial direction of the magnet 15 and a central position P19 in the radial direction of the FG pattern 19 with respect to the central axis 18c of the driving shaft 18 is taken as θ (θ<90 degrees), 0 degree<A≦θ is satisfied. The effect obtained by this configuration will be described below.

Figure 5:
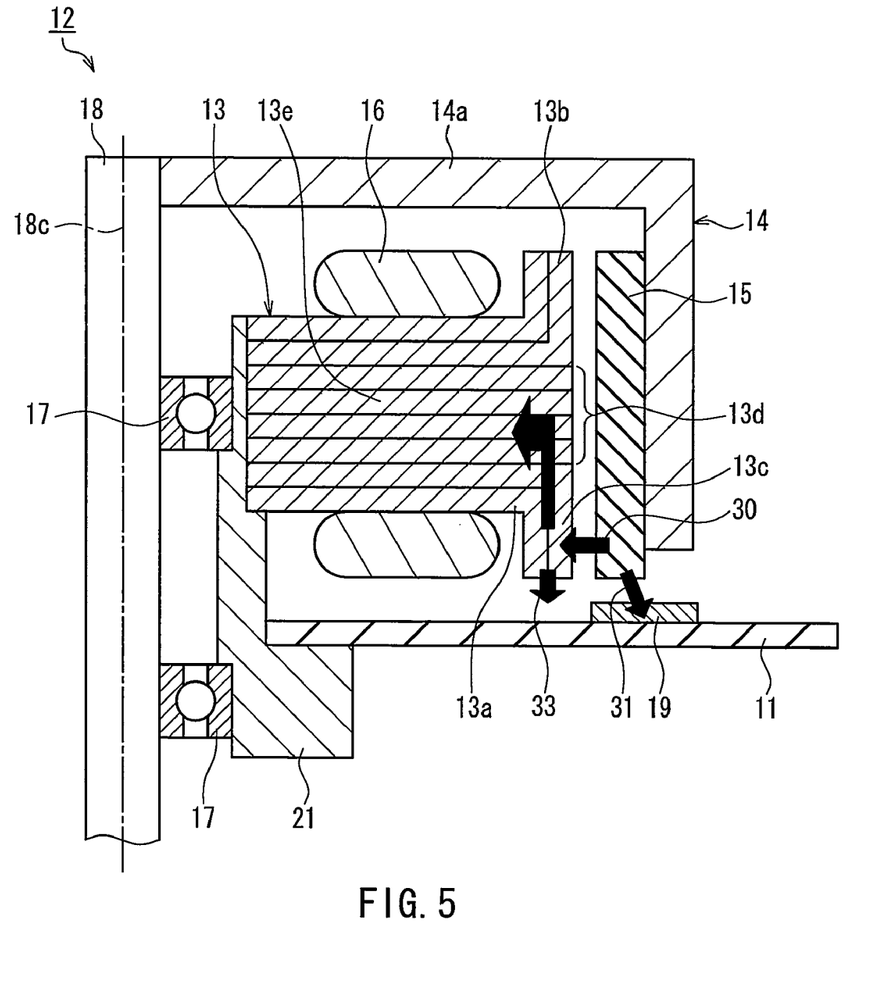
FIG. 5 is a cross-sectional view showing simplified flows of magnetic fluxes near the FG pattern in the motor according to the embodiment of the present invention.
Figure 6:
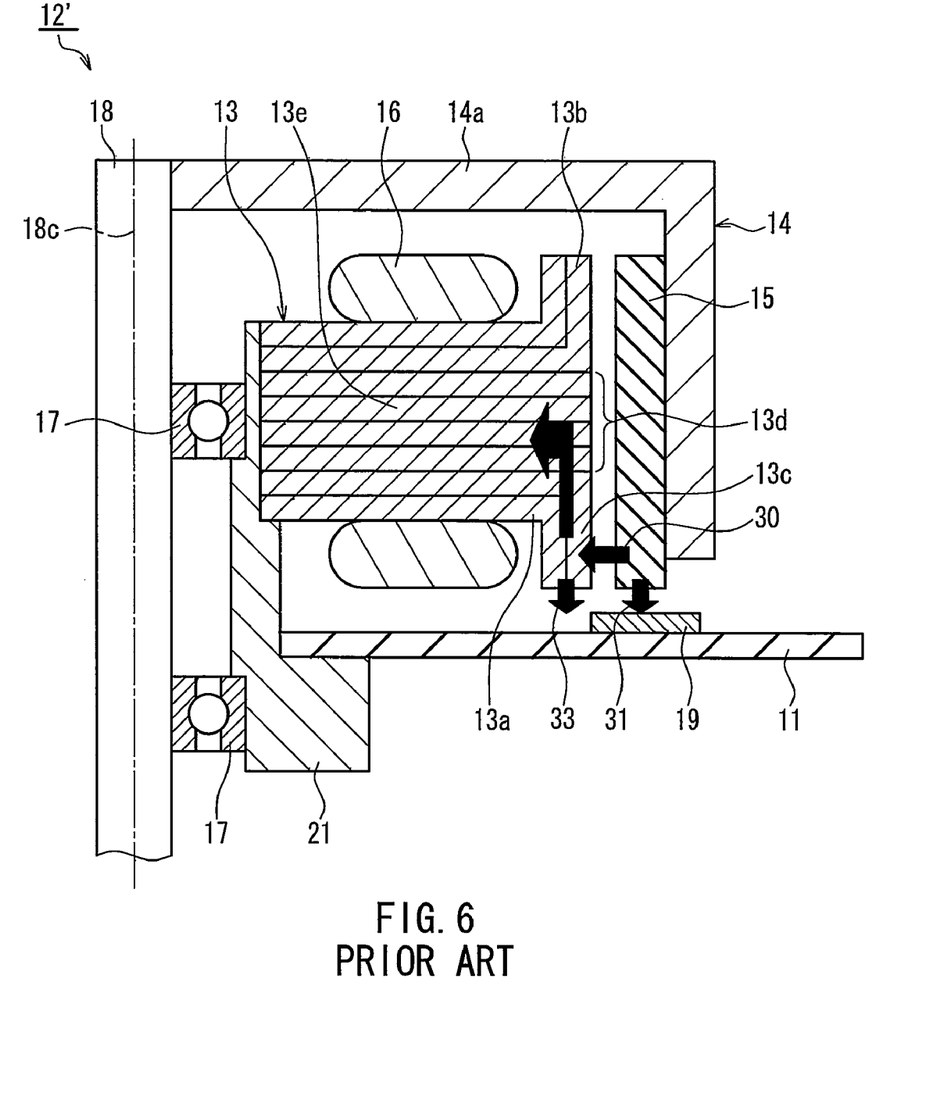
FIG. 6 is a cross-sectional view showing simplified flows of magnetic fluxes near the FG pattern in a conventional motor.

FIG. 5 is a cross-sectional view showing, as arrows, simplified flows of magnetic fluxes near the FG pattern 19 in the motor 12 according to this embodiment. FIG. 6 is a cross-sectional view showing, as arrows, simplified flows of magnetic fluxes near the FG pattern 19 in a conventional motor 12'. The conventional motor 12' shown in FIG. 6 is different from the motor 12 of this embodiment in that part of the FG pattern 19 on the inner circumferential side is disposed on an inner side in the radial direction (on the driving shaft 18 side) of the outer circumferential face of the stator 13, and in that the angle A and the angle θ described in FIG. 4 satisfy A=θ=0 degree.

In both of the motor 12 of this embodiment and the conventional motor 12', magnetic fluxes obtained by the main magnetization 30 are collected to the extended portions 13b and 13c through their magnetism collecting effect. Most of the collected magnetic fluxes pass through the extended portions 13b and 13c, and proceed to the magnetic path 13e of the magnetic pole 13a. However, due to magnetic saturation of the extended portions 13b and 13c, part of the magnetic fluxes leaks out of the extended portions 13b and 13c, and forms leakage magnetic fluxes. The leakage magnetic fluxes can be reduced by increasing the thickness of the extended portions 13b and 13c, but cannot be completely reduced to zero. Furthermore, since the extended portions 13b and 13c are arranged at a predetermined interval in the circumferential direction, a magnetism collecting effect on magnetic fluxes obtained by the main magnetization 30 differs between a portion where the extended portions 13b and 13c are present and a portion where these extended portions are not present, and, thus, leakage magnetic fluxes from the extended portions 13b and 13c become non-uniform.

In the conventional motor 12', as shown in FIG. 6, part of the FG pattern 19 on the inner circumferential side is disposed on an inner side in the radial direction of the outer circumferential face of the stator 13. Accordingly, the influence of a leakage magnetic flux 33 formed by magnetic fluxes obtained by the main magnetization 30 leaking out of the first extended portion 13c is stronger at a portion of the FG pattern 19 close to the first extended portion 13c (e.g., the inner circumferential portion of the main pattern 19a) than at a portion of the FG pattern 19 away from the first extended portion 13c (e.g., the cancellation pattern 19b). Accordingly, the influence of the leakage magnetic flux 33 on the FG pattern 19 cannot be canceled sufficiently by the main pattern 19a and the cancellation pattern 19b, and noise is superimposed on the FG signal.

On the other hand, in the motor 12 of this embodiment, the FG pattern 19 is disposed on an outer side in the radial direction of the outer circumferential face of the stator 13. Accordingly, the angle θ described in FIG. 4 satisfies θ>0 degree. That is to say, as shown in FIG. 5, the FG pattern 19 is away from the first extended portion 13c. Accordingly, the leakage magnetic flux 33 from the first extended portion 13c is hardly linked to the FG pattern 19. Accordingly, the influence of the leakage magnetic flux 33 on a portion of the FG pattern 19 close to the first extended portion 13c (e.g., the inner circumferential portion of the main pattern 19a) and that on a portion away from the first extended portion 13c (e.g., the cancellation pattern 19b) are small and similar to each other. Accordingly, the influence of the leakage magnetic flux 33 on the FG pattern 19 can be canceled sufficiently by the main pattern 19a and the cancellation pattern 19b. Thus, noise superimposed on the FG signal is reduced, and the precision in detecting the rotational speed using the FG pattern 19 can be improved.

However, in the configuration shown in FIG. 6, when the FG pattern 19 simply is moved to the outside of the outer circumferential face of the stator 13 in the radial direction, the amount of magnetic fluxes obtained by the FG magnetization 31 linked to the FG pattern 19 also is reduced. Thus, an induced voltage (FG components) generated by magnetic fluxes obtained by the FG magnetization 31 is lowered, and the precision in detecting the rotational speed cannot be improved sufficiently. Accordingly, in this embodiment, the FG magnetization 31 is obliquely magnetized in a direction to the FG pattern 19 such that the angle A described in FIG. 4 satisfies 0 degree<A≦θ. In the case where the angle A satisfies 0 degree<A, more magnetic fluxes obtained by the FG magnetization 31 can be linked to the FG pattern 19, and, thus, the FG components increase, and the rotational speed can be detected at a high precision. Here, the angle A is not greater than the angle θ. In the case where A>θ, the distance between the lower face of the magnet 15 on which the FG magnetization 31 is performed and the FG pattern 19 increases, and, thus, the amount of magnetic fluxes obtained by the FG magnetization 31 linked to the FG pattern 19 is reduced, and the FG components are lowered.

In the motor 12 of Embodiment 1 and the conventional motor 12', an induced voltage (FG components) generated at the FG pattern 19 by magnetic fluxes obtained by the FG magnetization 31, and an induced voltage (noise components) generated at the FG pattern 19 by the leakage magnetic flux 33 formed by magnetic fluxes obtained by the main magnetization 30 were obtained using a magnetic field analysis. Table 1 shows the results.

TABLE 1

|  | Product of the present invention | Conventional product |
| --- | --- | --- |
| FG component [mV] | 8.5 | 8.4 |
| Noise component [mV] | 0.04 | 0.09 |

According to Table 1, the motor 12 of this embodiment shown in FIG. 5 ("product of the present invention") has more FG components and less noise components than those of the conventional motor 12' shown in FIG. 6 ("conventional product"), and it was confirmed that the rotational speed can be detected with a high precision according to the present invention.

As described above, according to this embodiment, the FG pattern 19 is disposed on an outer side in the radial direction of the outer circumferential face of the stator 13, and, thus, the amount of magnetic fluxes linked to the FG pattern 19, of the leakage magnetic flux 33 formed by the main magnetization 30 leaking out of the first extended portion 13c, can be reduced. Furthermore, the FG pattern 19 is disposed on a face of the wiring board 11 opposing the rotor 14 so as to oppose the magnet 15, and the direction of the FG magnetization 31 is oblique to the FG pattern 19 such that 0 degree<A≦θ is satisfied, and, thus, the amount of magnetic fluxes obtained by the FG magnetization 31 linked to the FG pattern 19 can be increased. As a result, noise components superimposed on the FG signal are reduced, and FG components increase, and, thus, the precision in detecting the rotational speed using the FG pattern 19 can be improved.

Accordingly, it is possible to improve the precision in detecting the rotational speed using the FG signal, while maintaining efficient driving, using the first and the second extended portions 13b and 13c.

In the present invention, it is preferable that, in a cross-section along a plane including the central axis 18c of the driving shaft 18, the central position in the radial direction of the main pattern 19a is disposed on an outer side in the radial direction of the outer circumferential face of the magnet 15. Accordingly, the main pattern 19a can be further away from the first extended portion 13c, and, thus, the amount of magnetic fluxes linked to the main pattern 19a, of the leakage magnetic flux 33 from the first extended portion 13c, can be reduced further. Accordingly, noise components superimposed on the FG signal are reduced further, and the precision in detecting the rotational speed using the FG pattern 19 can be improved further.

Figure 7:
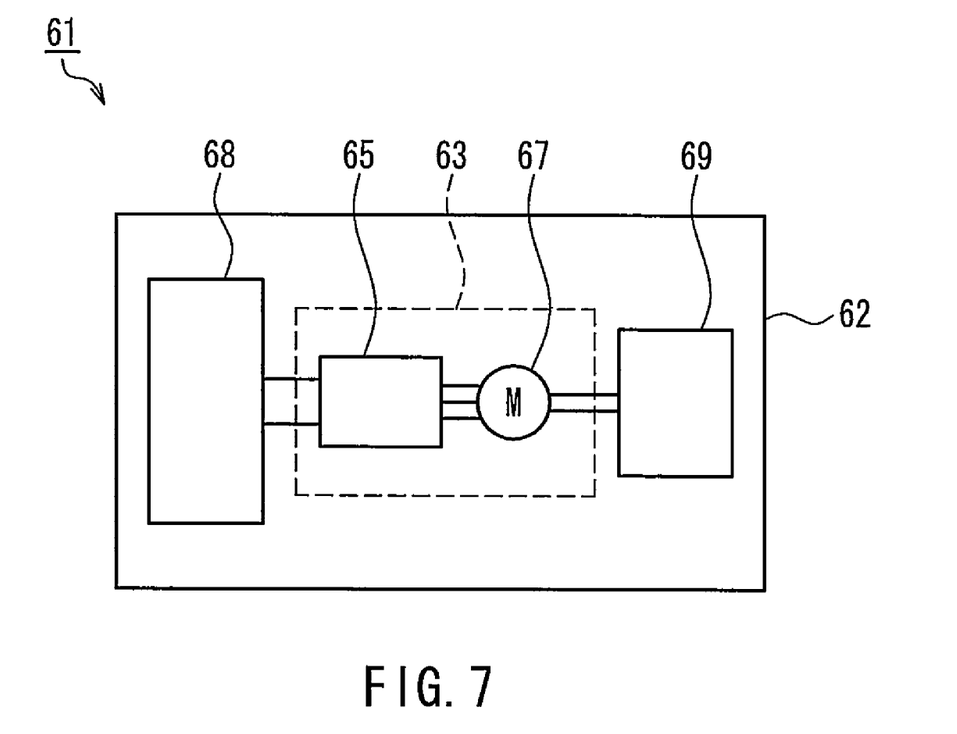
FIG. 7 is a diagram showing the schematic configuration of an example of an electronic apparatus using the motor of the present invention.

FIG. 7 is a diagram showing the schematic configuration of an example of an electronic apparatus using the motor of the present invention. In FIG. 7, an electronic apparatus 61 includes a casing 62 that functions as a main body case, an electric motor 67 mounted inside the casing 62, a driving unit 65 for driving the electric motor 67, a power source 68 for supplying electricity to the driving unit 65, and a load (driven member) 69 such as a mechanism portion that is driven using the electric motor 67 as a power source. Here, the electric motor 67 and the driving unit 65 constitute an electric motor drive apparatus 63. The electric motor 67 is driven by electrical power supplied from the power source 68 via the driving unit 65. A rotational torque is transmitted via the driving shaft of the electric motor 67 to the load 69. The motor 12 of the present invention can be used as the electric motor 67.

For example, a laser printer can be given as an example of the electronic apparatus 61. In this case, a paper feed roller corresponds to the load 69. The motor 12 of the present invention may be mounted together with various electronic components on the wiring board 11 that is horizontally provided in a main body case of the laser printer. In the motor 12, a gear (not shown) can be fixed to a lower portion of the driving shaft 18 that passes through the wiring board 11 and extends downward, and this gear and a gear provided at the paper feed roller can be coupled to each other via a gearbox (not shown) functioning as a deceleration mechanism. The motor 12 of the present invention has a high driving efficiency and excellent precision in detecting the rotational speed, and, thus, paper can be sent efficiently and precisely while suppressing non-uniform rotation, noise, and the like, and a laser printer can be realized that can perform accurate printing without print position shift or the like.

According to the present invention, it is possible to provide a motor that has an improved precision in detecting the rotational speed while maintaining efficient driving. Thus, the present invention is preferable for a motor that is used in electronic apparatuses such as laser printers, laser copiers, and the like. Here, the motor of the present invention is not limited to these, and can be used widely as a motor that is required to have a highly precise in rotation.

The embodiments described above are solely intended to elucidate the technological content of the present invention, and the present invention is not limited to or by these specific examples alone. Various modifications are possible within the spirit of the invention and the scope of the claims, and the present invention should be interpreted broadly.

What is claimed is:
1. A motor, comprising:
   a stator that is mounted on a substrate and on whose outer circumference a plurality of magnetic poles are arranged at a first predetermined interval; and
   a rotor that is rotatably disposed around the stator;
   wherein an inner circumferential face of the rotor is provided with a magnet,
   main magnetization is performed on a face of the magnet opposing the stator to have opposite polarities at a second predetermined interval in a direction opposing the stator, and FG magnetization is performed on a face of the magnet opposing the substrate to have opposite polarities at a third predetermined interval,
   each of outer circumferential ends of the plurality of magnetic poles of the stator is provided with a first extended portion that extends from a magnetic pole base to the substrate side, and a second extended portion that extends from the magnetic pole base to a side opposite the substrate side,
   a face of the substrate opposing the rotor is provided with a FG pattern including a main pattern and a cancellation pattern such that the FG pattern opposes the magnet, the FG pattern is disposed on an outer side in a radial direction of an outer circumferential face of the stator, and in a cross-section along a plane including a central axis of a driving shaft coupled to the rotor, when an angle formed by a straight line connecting a central position in the radial direction of the magnet and a central position in the radial direction of the FG pattern with respect to the central axis of the driving shaft is taken as θ (θ<90 degrees), and an angle formed by a direction of the FG magnetization with respect to the central axis of the driving shaft is taken as A (A<90 degrees), 0 degree<A≦θ is satisfied.

2. The motor according to claim 1, wherein, in the cross-section along the plane including the central axis of the driving shaft coupled to the rotor, a central position in the radial direction of the main pattern is disposed on an outer side in the radial direction of an outer circumferential face of the magnet.

3. An electronic apparatus, comprising:
a main body case;
a driven member that is provided in the main body case; and
a motor that is coupled to the driven member;
wherein the motor is the motor according to claim 1.

* * * * *

UNITED STATES PATENT AND TRADEMARK OFFICE
CERTIFICATE OF CORRECTION

PATENT NO. : 8,159,097 B2
APPLICATION NO. : 12/813258
DATED : April 17, 2012
INVENTOR(S) : Yoshikawa et al.

Page 1 of 1

It is certified that error appears in the above-identified patent and that said Letters Patent is hereby corrected as shown below:

Title Page, Item [56], References Cited, Foreign Patent Documents: "200625537" should be --2006-25537--.
Title Page, Item [56], References Cited, Foreign Patent Documents: "2007244004" should be --2007-244004--.

Signed and Sealed this
Sixteenth Day of October, 2012

David J. Kappos
*Director of the United States Patent and Trademark Office*